United States Patent
Di Grazia et al.

(10) Patent No.: US 8,611,468 B2
(45) Date of Patent: Dec. 17, 2013

(54) DEMODULATOR OF DIGITAL MODULATED SIGNAL, RECEIVER APPARATUS EMPLOYING THE DEMODULATOR, AND DEMODULATION METHOD

(75) Inventors: Domenico Di Grazia, Arzano (IT); Michele Renna, Cervinara (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 361 days.

(21) Appl. No.: 12/981,277

(22) Filed: Dec. 29, 2010

(65) Prior Publication Data
US 2012/0170688 A1 Jul. 5, 2012

(51) Int. Cl.
*H04L 27/24* (2006.01)
(52) U.S. Cl.
USPC .......................................... 375/324
(58) Field of Classification Search
USPC ............. 342/357.12, 357.23, 357.28, 357.63, 342/450, 463; 368/14; 370/347, 357, 442, 370/503, 508; 375/147, 224, 259, 279, 283, 375/316, 324, 329, 330, 340; 455/101, 455/456.1; 701/45, 213; 715/716
See application file for complete search history.

(56) References Cited

U.S. PATENT DOCUMENTS

| 5,671,253 A * | 9/1997 | Stewart ......................... 375/316 |
| 7,650,156 B2 * | 1/2010 | Krasner ...................... 455/456.1 |
| 8,149,956 B1 * | 4/2012 | Su .................................. 375/334 |
| 2008/0095255 A1 * | 4/2008 | Tanaka et al. ................. 375/260 |
| 2009/0160705 A1 * | 6/2009 | Matsuzaki ............... 342/357.12 |
| 2010/0134349 A1 | 6/2010 | Lennen et al. ........... 342/357.03 |

* cited by examiner

*Primary Examiner* — Sam K Ahn
*Assistant Examiner* — Shawkat M Ali
(74) *Attorney, Agent, or Firm* — Seed IP Law Group PLLC

(57) ABSTRACT

A demodulator comprising an input structured to receive at least one past value and a current value both associated with the same bit transmitted in different time instants, a bit decoder configured to provide a decoded bit from an input value, a quality signal evaluation module configured to provide a quality signal representing a quality of the current value, and a filtering module structured to provide a filtered value computed as a weighted average of said at least one past value and said current value. Moreover the demodulator comprises a selection module connected between said input and said bit decoder, configured to transfer the current value as the input value of the bit decoder if the quality is greater than a reference value or transfer the filtered value as the input value of the bit decoder if the quality is not greater than the reference value.

19 Claims, 7 Drawing Sheets

DEMODULATOR OF DIGITAL MODULATED SIGNAL, RECEIVER APPARATUS EMPLOYING THE DEMODULATOR, AND DEMODULATION METHOD

BACKGROUND

1. Technical Field

The present disclosure relates to demodulation techniques of digital modulated signals in communication systems. Particularly and not exclusively the present disclosure refers to demodulation techniques applicable to the field of global navigation satellite systems.

2. Description of the Related Art

Satellite-based positioning systems include constellations of earth orbiting satellites that constantly transmit orbit data and ranging signals to receivers. An example of a satellite-based positioning system is the Global Positioning System (GPS). A GPS receiver receives the satellite signal information from at least four satellites and calculates the receiver location by measuring the range of the receiver from each used satellite and determining the accurate position of each used satellite in a suitable reference coordinate system. Accurate satellite position is computed from a specific set of data referred as ephemeris. For example the ephemeris data of a GPS satellite allows the receiver to compute the satellite position, in addition to its velocity, clock bias, and clock drift over a future time interval of approximately four hours. Therefore, a correct ephemeris data downloading is an important step that the conventional receiver has to perform to determine the position of the receiver. In the context of a GPS system the demodulation of the Binary Phase Shift Keying modulated data ephemeris is performed, according to a particular technique, through a Differential Binary Phase Shift Keying, D-BPSK, demodulation method. Moreover the time taken for a correct ephemeris data demodulation and decoding has a direct impact on the amount of time taken by the receiver to get the first fix, known as Time To First Fix, TTFF, once it is turned on.

However, there are many environmental situations that cause an attenuation of the received satellite's signal. Low signal strength conditions can occur in challenging environments such as urban canyons, under foliage, inside tunnels etc. The low signal strength condition can prevent the correct demodulation or decoding of the ephemeris data because of the consequential increase of the bit error rate, BER. So in low signal strength conditions a correct data ephemeris demodulation and decoding takes a longer time with respect, for example, to a theoretical 30 seconds.

U.S. Patent Application No. 2010/0134349, describes a system for data decode in a GPS receiver provided with a Data Inversion Prevention Algorithm subsystem, DIPA, having a Differential Binary Phase Shift Keying demodulator. The differential binary phase shift demodulator performs a difference between the I/Q phase value of the current bit and the I/Q phase value of the previous bit stored in a delay register, using a differential phase unit. Similarly, the I/Q phase value of the current bit is compared against the I/Q phase value corresponding to a bit that is two bits prior to the current bit. The I/Q phase value for this older bit is stored in a second delay register. The same phase difference computation method applies to a bit that is three bits and four bits prior to the current one. The above described four independent processing lines generate four independent bit decisions that are finally combined into a majority voting criteria unit that performs the final bit decision.

BRIEF SUMMARY

The applicants observe that in digital modulated signal demodulators, in low signal strength conditions the bit error rate increases. This can lead to unsatisfactory receiver performance in terms of time taken to correctly acquire data. The applicants also notice that the digital modulated signal demodulators of the prior art have performance issues that are limited by the increased bit error rate.

According to an embodiment, a digital modulated signal demodulator includes an input structured to receive at least a past value and a current value both associated with a same bit transmitted in different time instants, a bit decoder configured to provide a decoded bit from an input value, a quality signal evaluation module configured to provide a quality signal representing a quality of the current value, a filtering module structured to provide a filtered value computed as a weighted average of said at least a past value and said current value, and a selection module connected between said input and said bit decoder, the selection module configured to transfer the current value as the input value of the bit decoder if the quality is greater than a reference value and transfer the filtered value as the input value of the bit decoder if the quality is not greater than the reference value.

Further embodiments include a digital modulated signal receiving apparatus and a demodulation method.

A digital modulated signal demodulator may be summarized as including an input structured to receive at least one past value and a current value, both the at least one past value and the current value associated with a same bit transmitted in different time instants; a bit decoder configured to provide a decoded bit from an input value; a quality signal evaluation module configured to provide a quality signal representing a quality of the current value; a filtering module structured to provide a filtered value computed as a weighted average of said at least one past value and said current value; and a selection module coupled between said input and said bit decoder, the selection module configured to transfer the current value as the input value of the bit decoder if the quality is greater than a reference value, and the selection module further configured to transfer the filtered value as the input value of the bit decoder if the quality is not greater than the reference value.

A receiving apparatus may be summarized as including a receiving module configured to receive digitally modulated analog signals and generate corresponding digital received signals; a processing module configured to process said digital received signals and generate a discrete-time sequence of samples; and a digital modulated signal demodulator structured to receive said discrete-time sequence of samples the digital modulated signal demodulator including: a terminal structured to receive at least one past value and a current value, both the at least one value and the current value associated with a same bit transmitted in different time instants, and both the at least one value and the current value obtained from said sequence of discrete-time samples; a bit decoder configured to provide a decoded bit from an input value; a quality signal evaluation module configured to provide a quality signal representing a quality of the current value; a filtering module structured to provide a filtered value computed as a weighted average of said at least one past value and the current value; and a selection module coupled between said terminal and said bit decoder, the selection module configured to transfer the current value as the input value of the bit decoder if the quality is greater than a reference value, and the selection module further configured to transfer the filtered value as the input value of the bit decoder if the quality is not greater than the reference value.

A demodulation method of a digital modulated signal may be summarized as including receiving at least one past value and a current value, both the at least one past value and the current value associated with a same bit transmitted in different time instants; evaluating a quality of the of the current value; performing a weighted average of said at least one past value and said current value to provide a filtered value; conditionally transferring the current value to an output if the quality is greater than a reference value; conditionally transferring the filtered value to the output if the quality is not greater than the reference value; decoding a value available at the output; and generating a corresponding decoded bit.

BRIEF DESCRIPTION OF THE SEVERAL VIEWS OF THE DRAWINGS

Non-limiting and non-exhaustive embodiments are described with reference to the following drawings, wherein identical or analogous components or modules are indicated with the same reference numbers throughout the various views unless otherwise specified. The relative positions of elements in the drawings are not necessarily drawn to scale. For example, the various elements may be connected as illustrated, connected in other ways, and connected with other intervening elements. Some elements in the illustrations include electronic hardware, software, and cooperative combinations of electronic hardware and software. The particular elements of the figures have been selected for ease of recognition in the drawings. One or more embodiments are described hereinafter with reference to the accompanying drawings in which.

DETAILED DESCRIPTION

Figure 1:
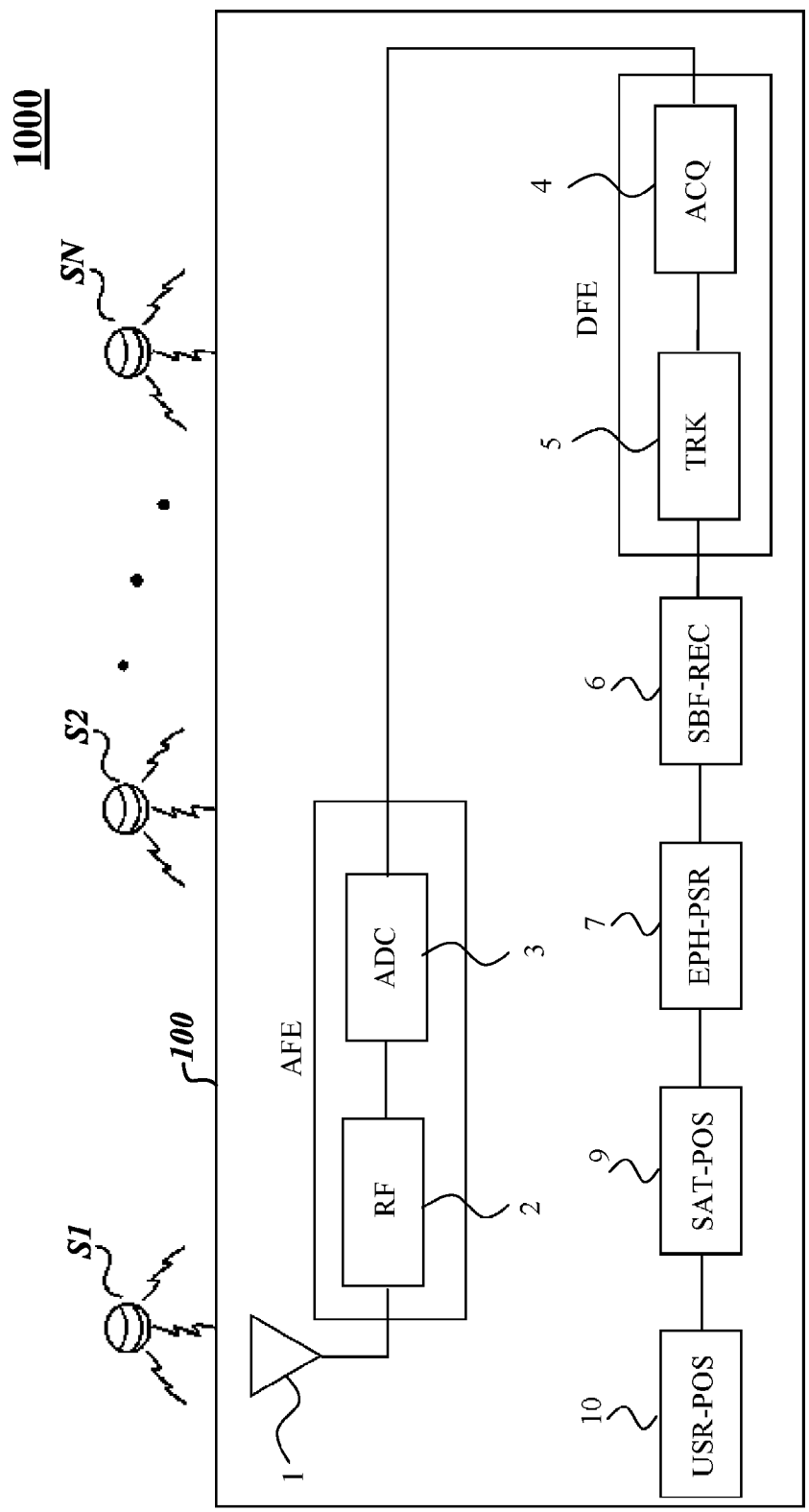
FIG. 1 schematically illustrates a global navigation satellite system according to an embodiment including a constellation of satellites and a receiving apparatus.

FIG. 1 schematically shows a GNSS system (global navigation satellite system) 1000 such as, for example the Global Positioning System (GPS), the Global'naya Navigatsionnaya Sputnikovaya Sistema (GLONASS), Galileo System, or other kinds of positioning systems based on satellites. The global navigation satellite system 1000 includes a constellation of S1-SN Satellites and at least one receiving apparatus 100.

In one embodiment, the receiving apparatus 100 includes an antenna 1, an analog front-end module AFE, having a radio frequency stage (RF) 2, and an analog-to-digital converter (ADC) 3, implementable through hardware modules. The receiving apparatus 100 further includes a digital front-end module DFE, including an acquisition module (ACQ) 4, and a tracking module (TRK) 5. Moreover the receiving apparatus 100 is provided with a sub-frame recovery module (SBF-REC) 6, an ephemeris processing and pseudo-range computing module (EPH-PSR) 7, a satellite position computing module (SAT-POS) 9 and a user's position computing module (USR-POS) 10.

In one embodiment, the acquisition module 4 and the tracking module 5 can be implemented through hardware while the remaining modules from 6 to 10 can be implemented by means including respective software. The receiving apparatus 100 is provided with a central processing unit, memories (mass memory and/or work memory) and their interfaces (not shown in the figures) including a microprocessor or a microcontroller, for implementing the software modules.

The following embodiments are described with reference to GPS technology, though other embodiments described hereinafter can be applied to other navigation satellite systems. When the receiving apparatus 100 is operating, the antenna 1 receives a plurality of signals from one or more satellites S1-SN of the satellite constellation operating in the system 1000. For example, these signals are modulated on a 1.5 GHz carrier. Specifically each received signal carries a pseudo-random code and a navigation data message.

The pseudo-random code, known as CA code, for example at 1 MHz, is used to differentiate one satellite from another and allows the receiving apparatus 100 to measure the time when the signal was transmitted by the corresponding satellite.

The navigation data message carries data (for example at a bit rate of 50 Hz) and in particular it is modulated according to the Binary Phase Shift Keying technique (BPSK). Moreover the navigation data message is hierarchically divided into frames and sub-frames and carries various information among which a plurality of parameters may be used in determining the orbit and therefore the position of the satellites.

The radio frequency stage 2 operates on the signals received at the antenna 1 (analog type) converting them in base band or at intermediate frequency band. Converter 3 converts the analog base band signals into corresponding digital signals. The acquisition module 4 allows detecting, based on the digital output signals from the converter 3, which satellites in the S1-SN constellation are in sight, that is, for which satellites a signal suitable for identification is received.

Further the acquisition module 4 detects a plurality of parameters associated with the satellites and the acquisition module 4 is useful for satellite tracking over time. The tracking module 5 has several channels, each allocating the signal of a different satellite. Particularly, the tracking module 5 is configured to perform a frequency tracking loop. In accordance with another embodiment the tracking module 5 is configured to perform a phase tracking loop.

The tracking module 5 is structured to provide data to the subframe recovery module 6 in the form of a discrete-time sequence of couples of samples, referred as $\{I,Q\}$. Each $\{I,Q\}$ sample is the result of an in-phase and quadrature coherent integration over, as an example, each 20 ms bit period from a correlator (not shown) included in the tracking module 5.

According to a Binary Phase Shift Keying modulation technique (BPSK) each couple of samples {I,Q} represent a transmitted bit.

As it is well known in the field of digital communication theory, each {I,Q} sample can be also interpreted as a phasor, considering the I value and the Q value as the real and imaginary part of a two components vector in the complex Cartesian plane.

Moreover, for each satellite and at any moment, in the tracking module 5 the Doppler frequency and the travel time of the GPS signal transmitted by a satellite S1-SN is determined. The subframe recovery module 6 decodes the various sub-frames of the navigation data message of each received satellite by means of suitable algorithms. The ephemeris processing and pseudo-range computing module 7 stores the orbit for each satellite in the form of ephemeris data. The ephemeris processing and pseudo-range computing module 7 computes the distances between the satellites and the receiver 100; such distance is called pseudo-range. From these computed values and through the travel time of the GPS signal, the satellite position computing module 9 computes the positions, expressed in 3D coordinates, of the satellites at the time of transmission.

In this embodiment, the satellite position computing module 9 operates based on travel time of the GPS signal together with the receiving time (known by a clock inside the receiving apparatus 100). The satellite position computing module 9 operates so as to evaluate how long the signal from each satellite took to reach the receiving apparatus 100, thus evaluating the distance of the respective satellite (pseudo-range).

By means of a triangulation algorithm, the user's position computing module 10 computes the position of the receiving apparatus 100, the distances of the receiving apparatus 100 from, preferably, at least four satellites, and the positions of such satellites being known at this stage. Herein below the position of the receiving apparatus 100 (substantially coincident with the user's position) will be called "fix" according to the technical field.

Figure 6:
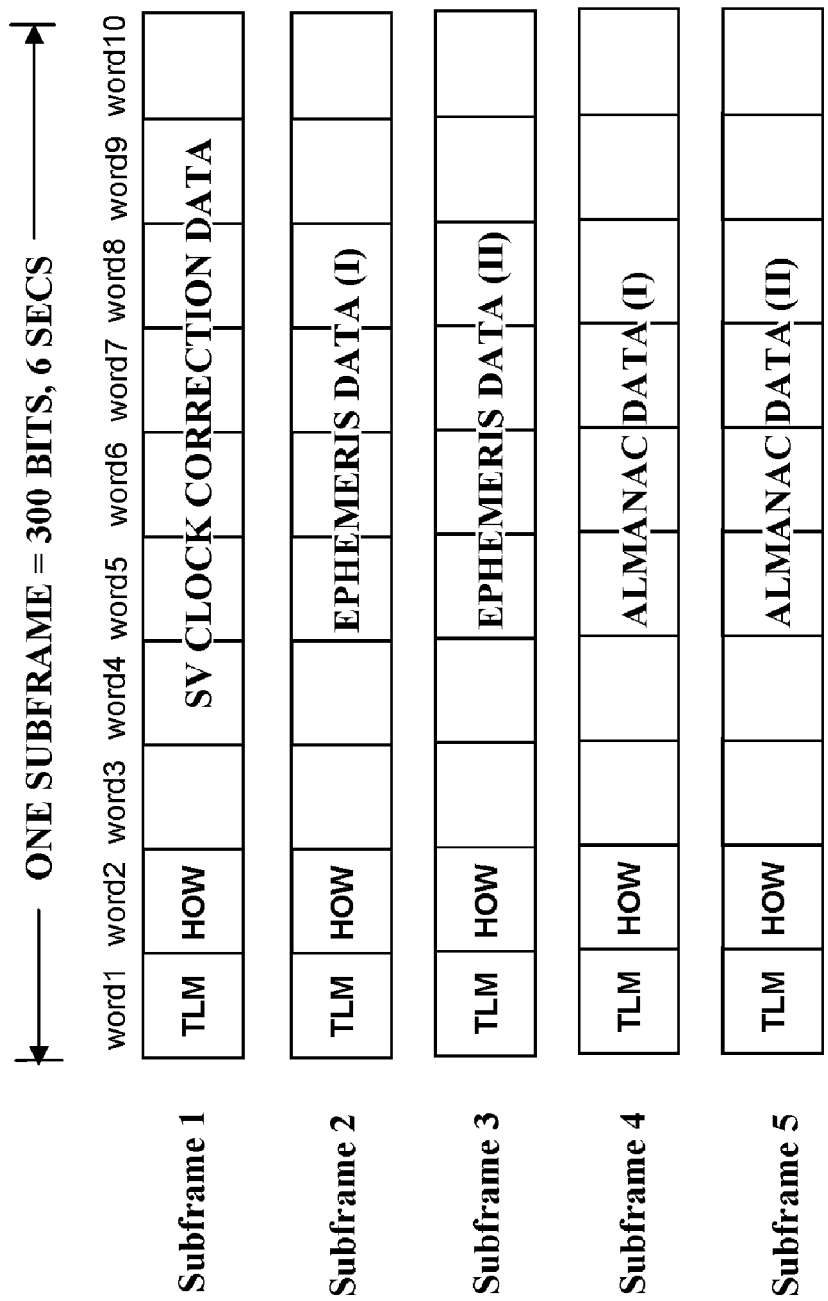
FIG. 6 schematically and generally shows data structures of one page of a GPS navigation data message.

FIG. 6 schematically and generally shows a data structure of one page or frame of the GPS system navigation data message. A page of the GPS navigation data message is structured into five subframes, which begin with a first word [word1] telemetry word (TLM) starting with an 8 bit identifier 10001011 (0x8b in hex), reported as a preamble. The TLM word is then followed by a second word [word2], the Handover word (HOW), where is recorded a timestamp for the packet and the subframe identification handle, and by 8 more data words [word3 . . . word10]. Each word has 30 bits At 20 ms per bit each word takes 0.6 seconds to transmit. Every subframe lasts 10 words, which takes 6 seconds.

Subframes are labeled [1 . . . 5] within the frame. Words 3-10 of subframes [1 . . . 3] repeat every 30 seconds, while subframes [4 . . . 5] are interleaved in pages with a complete cycle lasting 12.5 minutes (25 pages).

Information needed to compute satellite position, including clock correction data and ephemeris data of a given space vehicle (SV), is arranged in words [word3 . . . word10] of subframes [1 . . . 3]. Satellite navigation data includes ephemeris and almanac. Each satellite broadcasts its own ephemeris. In addition, each satellite transmits the almanac of all satellites, which is a coarse version of the ephemeris. A complete almanac is distributed in subframes [4 . . . 5] of 25 pages. In general, the ephemeris of one satellite is updated every two hours.

Figure 2:
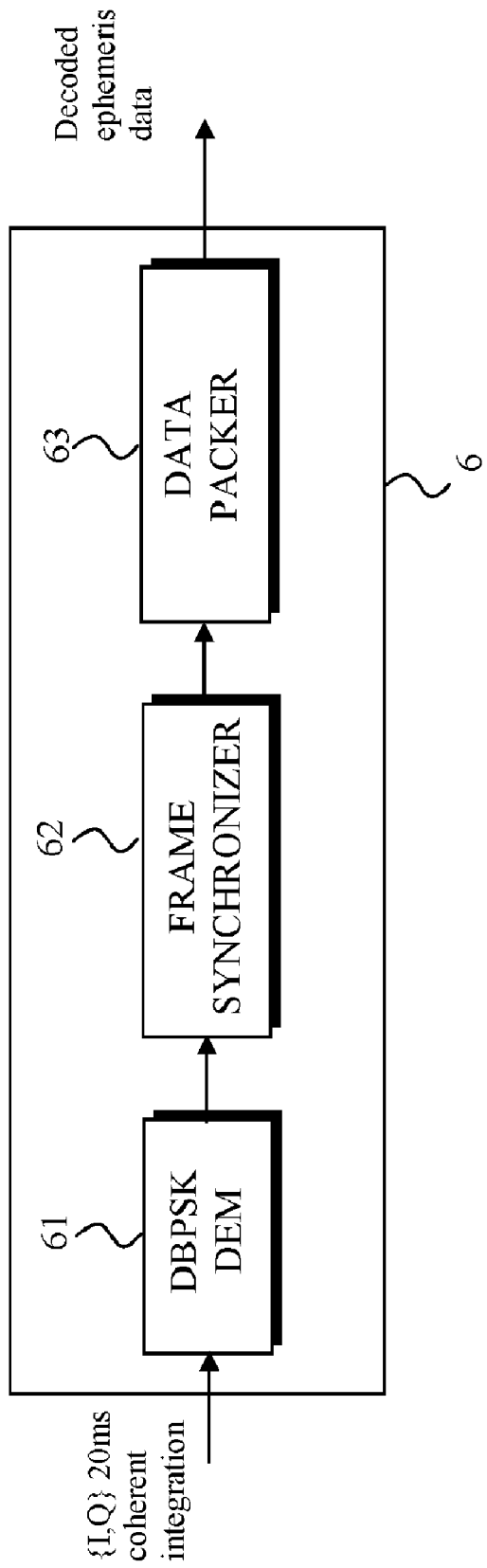
FIG. 2 through functional blocks, shows an embodiment of a subframe recovery module included in said receiving apparatus.

FIG. 2, through functional blocks, shows the subframe recovery module 6 according to an embodiment.

More specifically, the subframe recovery module 6, which can be a hardware or software module, includes a D-BPSK (Differential Binary Phase Shift Keying) demodulator 61 configured to demodulate and decode the subframes of the navigation data. Subframe recovery module 6 also includes a frame synchronizer 62, structured to identify the position of the demodulated bits within the frame structure of the navigation data message (FIG. 6) and check the parity of each received subframe. Subframe recover module 6 applies a parity check to each word 1-10 that forms the corresponding subframe. Moreover the subframe recovery module 6 further includes a Data Packer 63 configured to collect the received subframes within the frame structure of the navigation data message. The collected subframes are provided to the ephemeris processing and pseudorange computing module 7. It is observed that the D-BPSK (Differential Binary Phase Shift Keying) demodulator 61 is structured to perform a differential binary phase shift keying decoding of the received stream of samples even if in accordance with the described example such stream is not differentially encoded.

The D-BPSK demodulator 61 employed in the system 1000 is structured to perform a demodulation using an initial known data bit and to perform computing phase differences.

Figure 3:
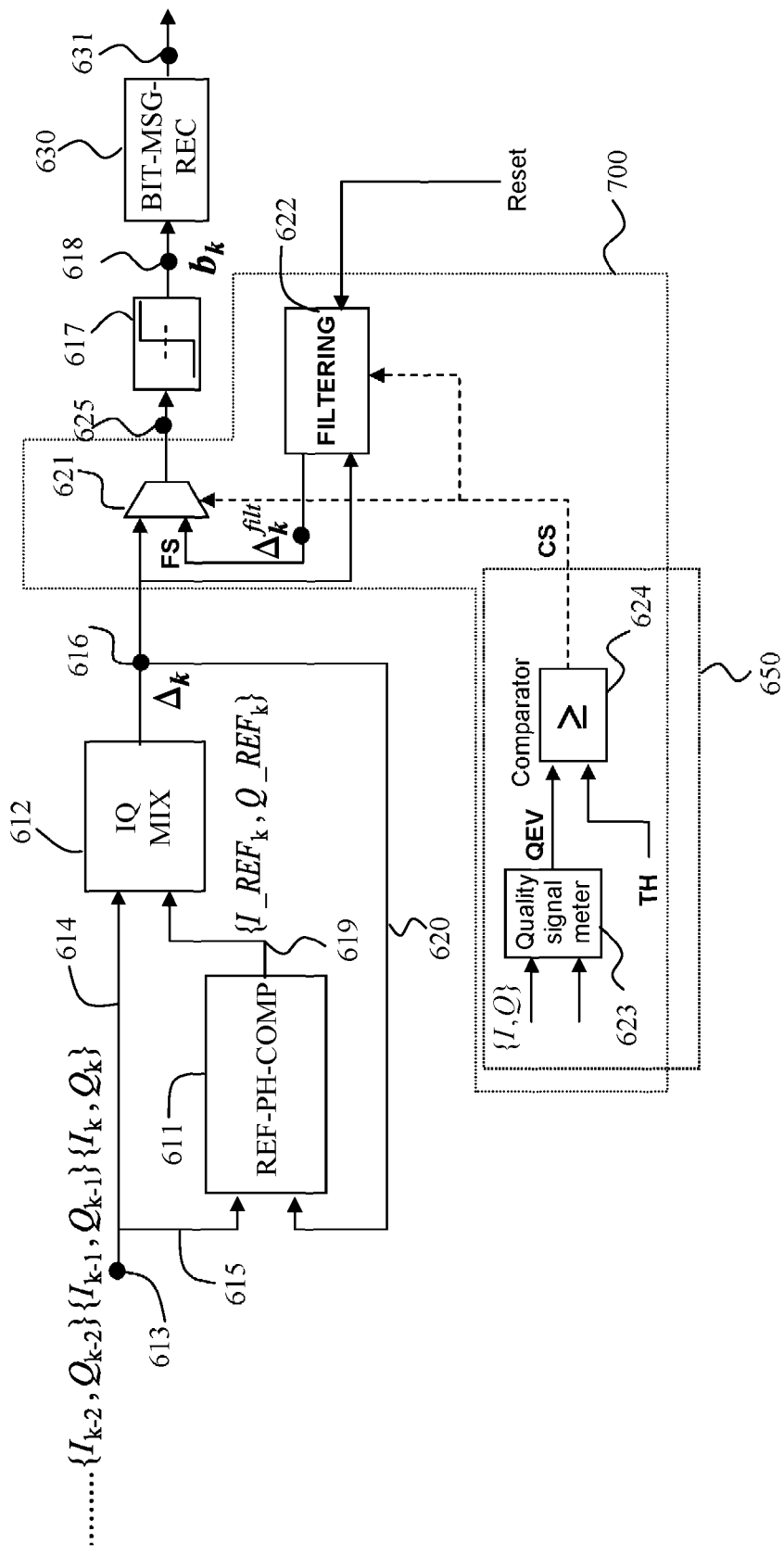
FIG. 3 shows by means of a functional block diagram a first embodiment of a D-BPSK demodulator, employing a filter and selection module, included in said subframe recovery module.

In greater detail, and according to a preferred example, FIG. 3 shows a functional block diagram of the D-BPSK demodulator 61. The D-BPSK demodulator 61 performs the differential demodulation and decoding of the navigation data message.

The D-BPSK demodulator 61 of FIG. 3 includes an input 613, a phase differentiator 612 (IQ-MIX), a reference phasor computational module 611 (REF-PH-COMP) and a first output 616. According to the functional scheme of FIG. 3, the input 613 is connected to the phase differentiator 612 by means of a first line 614 and to the reference phasor computational module 611 by means of a second line 615. An output of the reference phasor computational module 611 is connected to the phase differentiator 612 by means of a third line 619. The first output 616 is connected to the reference phasor computational module 611 by means of a fourth line 620. The first line 614, the second line 615, the third line 619, and the fourth line 620 represent data flow between the connected modules. Moreover, the D-BPSK demodulator 61 includes a filter and selection module 700 connected between the first output 616 and a respective output 625. Moreover D-BPSK demodulator 61 includes a bit decoder (DEC) 617 connected between the output 625 of the filter and selection module 700 and a second output 618. The second output 618 is connected to a bit message reconstruction module 630 (BIT-MSG-REC), provided with a third output 631.

The filter and selection module 700 includes a quality signal evaluation module 650, configured to provide a control signal CS representing the quality of the output value $\Delta_k$, and a filtering module 622 structured to generate a filtered value $\Delta^{filt}_k$. The filtered value $\Delta^{filt}_k$ is computed as a weighted average of at least a past output value and the current output value $\Delta_k$ associated with a same bit transmitted in different frames.

In accordance with the example referring to the GPS system, the same bit is transmitted every 30 seconds, corresponding to a period of 1500 bits, so the output values corresponding to the same bit are . . . $\Delta_{k-1500}, \Delta_k, \Delta_{k+1500}$ . . . .

Moreover the D-BPSK demodulator 61 of FIG. 3 includes a selection module 621 configured to transfer the output value $\Delta_k$ to the bit decoder 617 if the control signal CS indicates that the quality of the output value $\Delta_k$ is greater than a threshold value TH. On the contrary the selection module 621 is configured to transfer the filtered value $\Delta^{filt}_k$ if the control signal CS indicates that the quality of the output value $\Delta_k$ is not greater than the threshold value TH. The selection module 621 is provided with a first input connected to the first output 616, a second input FS, and a respective output 625 connected to the bit decoder 617.

In one embodiment, the quality signal evaluation module 650 includes a quality signal meter 623 configured to perform a measurement and provide a quality estimated value QEV as result of the measurement. Moreover the quality signal evaluation module 650 is provided with a comparator 624 configured to compare the quality estimated value QEV with said threshold value TH and provide accordingly the control signal CS.

According to a particular embodiment, the quality signal meter 623 can be a ratio of carrier power over noise power, or CN0, meter. In particular this CN0 meter 623 receives the stream of discrete-time samples {I,Q} sampled at 20 ms period and another stream of discrete-time samples {I,Q} sampled at 1 ms period both provided by the tracking module 5.

In another embodiment, the quality signal meter 623 can be a signal strength meter that receives the stream of discrete-time samples {I,Q} sampled at 20 ms period.

The quality estimated value QEV is provided to the comparator 624, which is configured to compare the quality estimated value QEV and the threshold value TH The comparator 24 is further configured to generate a control signal CS representing the result of the comparison to be provided to a control input of the selection module 621.

With reference to the filtering module 622, according to a particular embodiment, it can be an infinite impulse response IIR filter structured to compute the filtered value $\Delta^{filt}_{k}$ as a sum of the current output value $\Delta_k$ multiplied by a first coefficient, and a preceding filtered value $\Delta^{filt}_{k-1500}$ multiplied by a second coefficient.

In accordance with another embodiment the filtering module 622 can be a finite impulse response FIR filter, structured to computer the filtered value $\Delta^{filt}_{k}$ as a sum of the current output value $\Delta_k$ multiplied by a first coefficient, and at least a preceding output value $\Delta_{k-1500}$ value multiplied by at least a second coefficient.

An embodiment of the operation of the subframe recovery module 6 is hereafter described with reference to FIGS. 2 and 3.

At the input 613 the stream of discrete-time samples {I,Q}, including first past samples $I_{K-2}$ and $Q_{K-2}$, second past samples and $Q_{K-1}$ and current samples $I_K$ and $Q_K$, is received from the tracking module 5. The index k defines a selected discrete time instant. The reference phasor computational module 611 generates reference samples $I\_REF_k$ and $Q\_REF_k$ using at least the first past samples $I_{K-2}$ and $Q_{K-2}$ and the second past samples $I_{K-1}$ and $Q_{K-1}$. The phase differentiator 612 processes the current samples $I_K$ and $Q_K$ and the reference samples $I\_REF_k$ and $Q\_REF_k$, and provides on the first output 616, an output value $\Delta_k$.

The output value $\Delta_k$ represents a phase difference between a current phasor associated with the current samples $I_K$ and $Q_K$ and a reference phasor associated with the reference samples $I\_REF_k$ and $Q\_REF_k$.

According to an embodiment, the reference phasor computational module 611 performs a weighted average of at least the first past samples $I_{K-2}$ and $Q_{K-2}$ and the second past samples $I_{K-1}$ and $Q_{K-1}$ using at least two weights $w_1$, $w_2$. Moreover the fourth line 620 provides to the reference phasor computational module 611 the output value $\Delta_k$ which can be used by the phasor computational module 611 to desirably select the sign of said weights $w_1$, $w_2$.

Reference is now made to an embodiment of the filter and selection module 700 illustrated, for example, in FIG. 3. In a first condition, at the first output 616 a current output value $\Delta_k$ having good quality is provided by the phase differentiator 612. In this first condition the quality signal meter 623 generates a quality estimated value QEV above the threshold TH, indicating a good quality of the output value $\Delta_k$. The control signal CS generated by the comparator 624 is configured to control the selection module 621 to transfer the output value $\Delta_k$ to the bit decoder 617. Particularly the control signal CS is also coupled to the filtering module 622 to cause a reset of the filtering module 622 to a desired initial value. This desired initial value can be, for example, the current value $\Delta_k$.

In a second condition at the first output 616 a current output value $\Delta_k$ having poor quality is provided by the phase differentiator 612. In this second condition the quality signal meter 623 generates a quality estimated value QEV below the threshold TH, indicating a poor quality of the output value $\Delta_k$.

The control signal CS generated by the comparator 624 in said second condition activates the filtering module 622 which performs a weighted average of the current output value $\Delta_k$ and at least one past output value $\Delta_{k-1500}$ and provides the filtered value $\Delta^{filt}_{k}$.

The control signal CS generated by the comparator 624 in said second condition is configured to control the selection module 621 to transfer the filtered value $\Delta^{filt}_{k}$ to the bit decoder 617.

According to an alternative embodiment of the D-BPSK demodulator 61 of FIG. 3 the feedback module 60 described with reference to FIG. 4 can be fed with the value available at the output 625 of selection module 621 instead of the values available at the first output 616.

The bit decoder 617 receives the output value $\Delta_k$ and, applying a decision criteria (e.g., maximum likelihood criteria), provides on the second output 618 a resulting decoded bit $b_k$ representing the variation between two consecutive bits of the navigation data message. The bit message reconstruction module 630, receives the resulting decoded bit $b_k$ and provides, at the third output 631, the reconstructed navigation data message bit stream $\{b_k^{msg}\}$.

With reference to FIG. 2, the reconstructed bit stream $\{b_k^{msg}\}$ is provided to the frame synchronizer module 62, which detects the position of the demodulated bits within the frame structure of the navigation data message. The frame synchronizer module 62 checks the parity of each received subframe. Moreover the Data Packer 63 collects the received subframes of the navigation data message and organizes them in the designated frame structure to be provided to the ephemeris processing and pseudo-range computing module 7.

Figure 4:
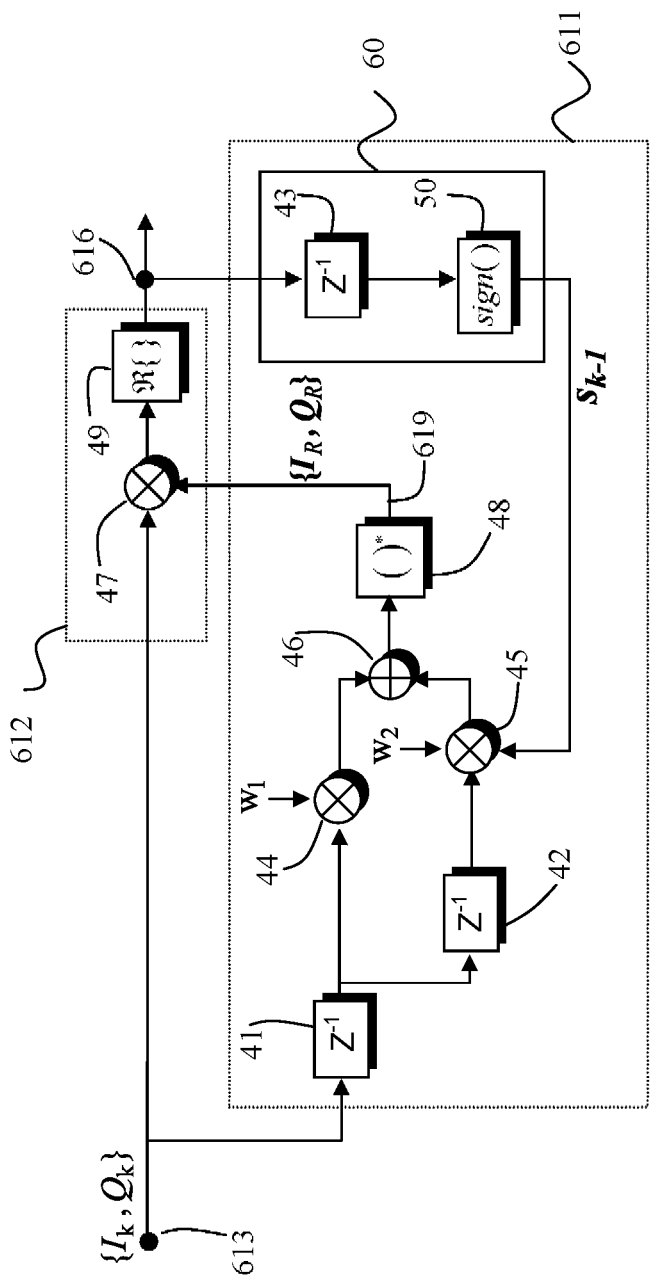
FIG. 4 through a block diagram shows a particular embodiment of a reference phasor computational module of said D-BPSK demodulator.

FIG. 4, through a block diagram, shows a particular embodiment of the reference phasor computational module 611 and the phase differentiator 612. According to the embodiment of FIG. 4, the operational modules included in the processing flow between the input 613 and the first output 616 shown apply to complex numbers. In particular a stream of complex numbers $I_k+jQ_k$, representing the corresponding pair $\{I_k,Q_k\}$ of samples, enters at the input 613 the D-BPSK demodulator 61 of FIG. 4.

The reference phasor computational module 611 includes a first delay register 41, which feeds an input of a first multiplier 44 having another input to receive a first weight $w_1$ and an output connected to an adder 46. Furthermore, an output of the first delay register 41 is connected to an input of a second delay register 42, which feeds a first input of a second multiplier 45 having an output connected the adder 46. Moreover the second multiplier 45 is provided with a second input configured to receive a second weight $w_2$, and a third input.

An output of the adder 46 is connected to conjugation module 48 having a corresponding output connected to the phase differentiator 612 to provide the reference samples I_REF$_k$ and Q_REF$_k$.

According to the particular embodiment described, the phase differentiator 612, includes a multiplier 47, having a respective input connected to the input 613 and a further input connected to the output of the conjugation module 48. An output of the multiplier 47 feeds a Real operator 49 configured to extract the real part of its input value to be provided to the first output 616 of the phase differentiator 612. The reference phasor computational module 611 includes a feedback module 60 including a third delay register 43, fed by the first output 616, which shows an output connected to a sign operator module 50 which, as an example, generates a sign $s_{k-1}$ value equal to +1 or −1 dependent upon the sign of its input. An output of the sign operator module 50 is connected to the third input of the second multiplier 45.

An embodiment of the operation of the reference phasor computational module 611 and the phase differentiator 612 is hereafter described, with reference to FIG. 4.

Discrete-time samples corresponding to the following complex numbers are sequentially received at the input 613:

$I_k+jQ_k$ k-th phasor (i.e., current phasor)
$I_{k-1}+jQ_{k-1}$ (k−1)-th phasor (i.e., first past phasor)
$I_{k-2}+jQ_{k-2}$ (k−2)-th phasor (i.e., second past phasor)

It is observed that each phasor received at input 613 includes both useful signal and noise contributions.

The k-th phasor $I_k+jQ_k$ is provided to the multiplier 47 of the phase differentiator 612. The (k−1)-th phasor $I_{k-1}+jQ_{k-1}$ is available at the output of the first delay register 41, and (k−2)-th phasor $I_{k-2}+jQ_{k-2}$ is available at the output of the second delay register 42.

The first multiplier 44 performs a multiplication between the (k−1)-th phasor $I_{k-1}+jQ_{k-1}$ and the first weight $w_1$, as follows:

$$w_1 \cdot (I_{k-1}+jQ_{k-1}) \quad (1)$$

The second multiplier 45 performs a three terms multiplication among the (k−2)-th phasor $I_{k-2}+jQ_{k-2}$, the second weight $w_2$ and the sign $s_{k-1}$ value as provided by the sign operator module 50, as shown below $$s_{k-1} w_2 \cdot (I_{k-2}+jQ_{k-2}) \quad (2)$$

The adder 46 performs the summation between the values at the outputs of the first and second multipliers 44 and 45 respectively, generating the reference phasor:

$$I\_REF_k+jQ\_REF_k=w_1 \cdot (I_{k-1}+jQ_{k-1})+s_{k-1} \cdot w_2 \cdot (I_{k-2}+jQ_{k-2}) \quad (3)$$

In case the noise contributions affecting the (k−1)-th phasor, and the (k−2)-th phasor have statistically the same power and are uncorrelated the first and second weights $w_1$, and $w_2$ are non-zero equal values. As an example $w_1=w_2=0.5$. Using first and second weights $w_1$, and $w_2$ non-zero equal values in the above mentioned conditions, the weighted average of equation (3) allows reducing the impact of the noise contribution on the reference phasor computation. In case the noise contributions affecting the (k−1)-th phasor, and the (k−2)-th phasor have statistically different power the first and second weights $w_1$, and $w_2$ can be desirably selected to substantially raise the resulting signal to noise ratio affecting the computed reference phasor on the basis of the signal to noise ratio measured on both (k−1)-th phasor, and the (k−2)-th phasor.

The conjugation module 48, generates the complex conjugate of the reference phasor as expressed in equation (3), providing the following value:

$$I\_REF_k-jQ\_REF_k \quad (4)$$

The multiplier 47 of the phasor differentiator 612 performs a multiplication between the current phasor $I_k+jQ_k$, and the complex conjugate of the reference phasor, generating the following result:

$$I_k \cdot I\_REF_k+Q_k \cdot Q\_REF_k+j(Q_k \cdot I\_REF_k-I_k \cdot Q\_REF_k) \quad (5)$$

The resulting complex number in equation (5) represents the phase difference between the current phasor and the reference phasor.

The real operator 49 extracts the output value $\Delta_k$ that is the real part of the complex number in equation (5) and supplies it to the bit decoder module 617 and the third delay register 43. Particularly it can be shown that $\Delta_k$ is a value proportional to the cosine function of the phase difference between the current phasor and the reference phasor. Moreover a past output value $\Delta_{k-1}$, provided by the phase differentiator 612 at the discrete time instant (k−1)-th, is available at the output of the third delay register 43. The past output value $\Delta_{k-1}$, represents the phase difference between the (k−1)-th phasor received at the input 613 and a reference phasor computed at the discrete time instant (k−1). The sign operator module 50 extracts the sign of the $\Delta_{k-1}$ value and provides the sign value $s_{k-1}$ accordingly. According to an example a sign value $s_{k-1}=1$ indicates that the (k−1) phasor and the (k−2) phasor are associated with the same bit value. On the contrary, sign value $s_{k-1}=-1$ indicates that the (k−1) phasor and the (k−2) phasor are associated to different bit values. As a consequence, the sign value $s_{k-1}$ allows calculation of a coherent weighted average between the first and the second phasor as in equation (3).

According to another embodiment the weighted average performed by the reference phasor computational module 611 can be computed on the basis of at least three past phasors according to the following general expression which refers to N past phasors $$-I\_REK_k + jQ\_REK_k = w_1 \cdot (I_{k-1} + jQ_{k-1}) + \sum_{i=2}^{N} s_{k-i+1} \cdot w_{k-i} \cdot (I_{k-i} + jQ_{k-i}) \quad (5b)$$

The above shown expression (3) is a particular case of expression (5b) with N=2.

It is observed that the noise reduction expressed in equations (3) and (5b), allows a more robust data decoding with a reduced bit error rate. With reference to the GPS system, the reduced bit error rate on the bits representing the navigation data message implies a shorter time taken to download the navigation data message and so reduces the Time To First Fix.

Figure 5:
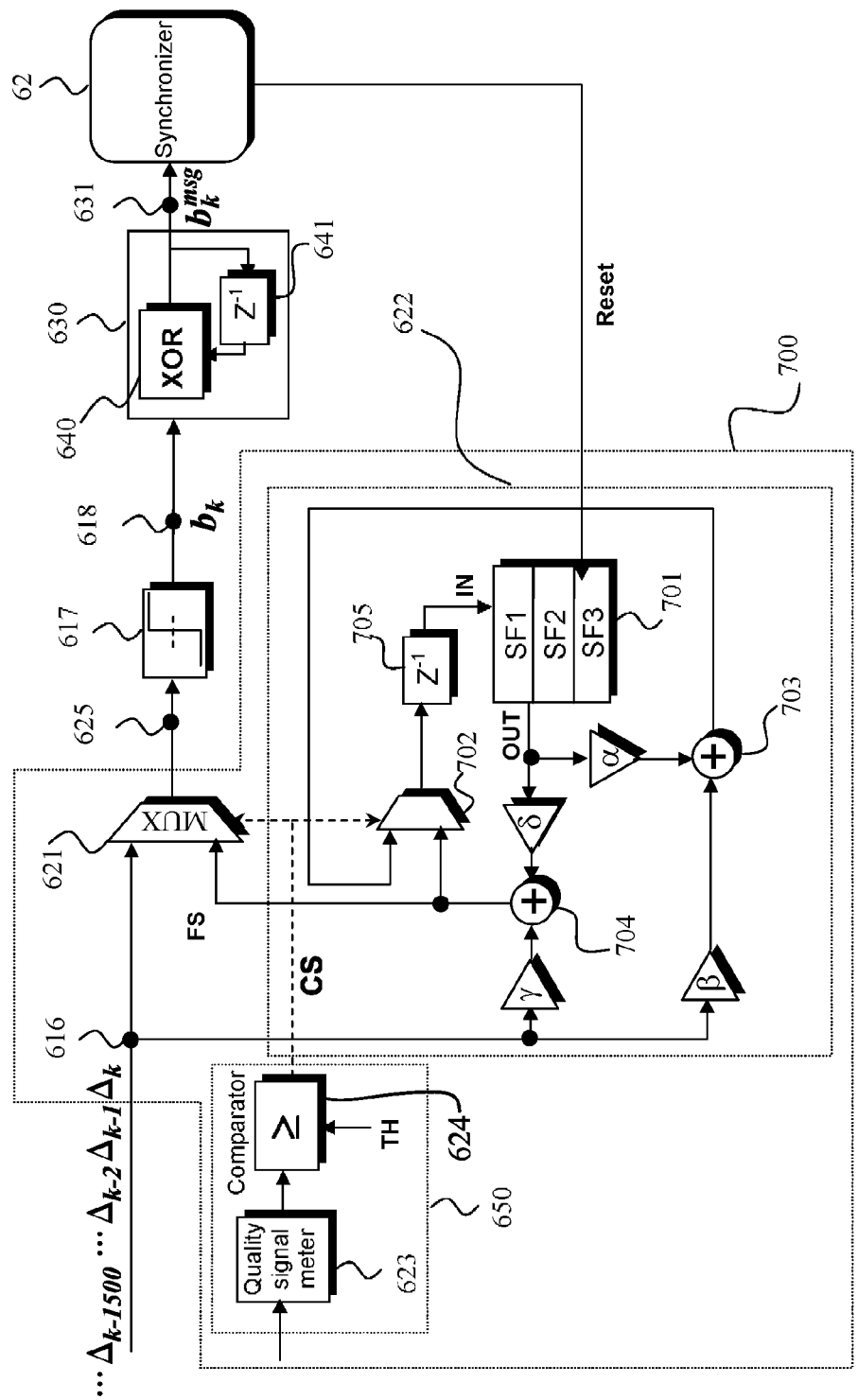
FIG. 5 depicts an example of said filter and selection module connected to a bit decoder module, a bit message reconstruction module, and a frame synchronizer.

Reference is now made to FIG. 5, which shows a particular example of IIR filtering module 622 of the filter and selection module 700. The depicted filter and selection module 700 in FIG. 5 refers to the processing of a specific subset of bits of the navigation data message, and in particular to the bits of the Subframes 1-3, whose index is included in the range [61:300], corresponding to words [word3 . . . word10] (FIG. 6), representing the ephemeris data.

The filtering module 622 includes a first weighted average module including a first gain coefficient block α, a second gain coefficient block β and a first adder 703. The filtering module 622 is also provided with a storage module 701 and a second weighted average module including a third gain coefficient block γ, a fourth gain coefficient block δ, and a second adder 704.

An output of the first adder 703 is connected to a first input of a further selection module 702 having a respective output connected to a fourth delay register 705 in turn connected to an input IN to the storage module 701. The further selection module 702 is provided with a second input connected to an output of the second adder 704. Moreover the further selection module 702 is provided with a respective control input to receive the control signal CS, an embodiment of which is described herein with reference to FIG. 3. An output OUT of the storage module 701 is connected to the fourth gain coefficient block δ and to the first gain coefficient block α. The first output 616 is connected to the third gain coefficient block γ and the second gain coefficient block β.

FIG. 5 also shows an example of the bit message reconstruction module 630 including an XOR operator 640 connected between the second output 618 and the third output 631. A fifth delay register 641 is feedback connected between the third output 631 and the XOR operator 640.

Moreover the frame synchronizer 62 is also depicted in the FIG. 5.

According to one embodiment, at the first output 616, the output value $\Delta_k$ is available.

Referring to the GPS system, the storage module 701 is provided with three register banks (or other types of memory modules), SF1-SF3, associated to the Subframe 1, Subframe 2 and Subframe 3 of the navigation data message. Each bank of registers SF1-SF3 in one embodiment includes a memory location for each bit of the corresponding subframe of the navigation data message included in the index range 61-300 corresponding to words [word3 ... word10], representing the ephemeris data. Such memory arrangements can be implemented because corresponding bits are repeated exactly the same among consecutive corresponding frames. Each memory location stores the filtered value $\Delta^{filt}_{k-1500}$ associated to the corresponding bit of the navigation data message.

With reference to the operation of the filter and selection module 700, a first condition is considered wherein the quality estimated value QEV is greater than the threshold TH and the comparator 624 (FIG. 3) provides a control signal CS to the selection module 621 which transfers the current output value $A_k$ to the bit decoder 617.

Furthermore, the current output value $\Delta_k$ enters the filtering module 622 that computes the filtered value $\Delta^{filt}_k$ as follow $$\Delta_k^{filt}=\alpha\cdot\Delta_{k-1500}^{filt}+\beta\cdot\Delta_k \qquad (6)$$

where α and β are first and second gain coefficients corresponding to the first and second blocks, respectively. The equation (6) is represented in FIG. 5 and described herein with respect to a first weighted average module.

The filtered value $\Delta_k^{filt}$ at the output of the first adder 703 is made available to the first input of the further selection module 702. The control signal CS allows the further selection module 702 to transfer the filtered value $\Delta k^{filt}$ resulting from equation (6) to the fourth delay register 705. The fourth delay register 705 will provide the value $\Delta_k^{filt}$ to the input IN of the storage module 701 to be stored in the designated memory location of the respective bit.

In a second condition the quality estimated value is not greater than the threshold TH and the comparator 624 (FIG. 3) provides a control signal CS to the selection module 621 which does not transfer the current output value $A_k$ to the bit decoder 617, and instead transfers the second input FS of the selection module 621 to the bit decoder 617.

The current output value $\Delta_k$ enters the filtering module 622 that computes the filtered value $\Delta^{filt}_k$ as follow $$\Delta_k^{filt}=\delta\cdot\Delta_{k-1500}^{filt}+\gamma\cdot\Delta_k \qquad (7)$$

where γ and δ are third and fourth gain coefficients corresponding to the third and fourth blocks respectively and $\Delta_{k-1500}^{filt}$ is the content of the designated memory location of the storage module 721 associated with the corresponding bit. The equation (7) is represented in FIG. 5 and described herein with respect to a second weighted average module.

The $\Delta_k^{filt}$ resulting from equation (7) at the output of the second adder 704 is made available to the second input of the further selection module 702. The control signal CS allows the further selection module 702 to transfer the filtered value $\Delta_k^{filt}$ available at the output of the second adder 704, to the fourth delay register 705. The fourth delay register 705 will provide the stored value $\Delta_k^{filt}$ to the input IN of the storage module 701 to be stored in the designated memory location of the respective bit.

Furthermore the $\Delta_k^{filt}$ resulting from equation (7) is provided to the second input FS of the selection module 621. The control signal CS controls the selection module 621 to transfer the filtered value $\Delta_k^{filt}$ available at the input FS to the bit decoder 617.

It is observed that in the second condition, where the quality estimated value is not greater than the threshold TH, corresponding incoming samples $\Delta_k$ could be considerably affected by noise. It is noticed that the low-pass filtering expressed in equation (7) allows reducing the amount of noise. The noise reduction on the data representing the ephemeris allows a more robust data decoding with a reduced bit error rate. As consequence a shorter time is taken to download the part of the navigation data message used to compute the first fix and so reducing the Time To First Fix. According to one embodiment, if the samples of the $\Delta_k$ stream are affected statistically by the same noise power and the noise is uncorrelated between different samples, setting third and fourth coefficients γ and δ equal to 1, so implementing the mathematical average across a set of $\Delta_k$ received samples, allows reducing the impact of the noise.

In the first condition where the quality estimated value QEV is greater than the threshold TH the incoming sample $\Delta_k$ value is dominated by the useful signal while the noise contribution is substantially negligible. In this first condition, according to a particular example, suitable settings for the first and second coefficients are α=0 and β=1.

Referring back to the operation of FIG. 5, the values available at the output 625 of the selection module 621 are provided to the bit decoder 617, which generates resulting decoded bits $b_k$ on the second output 618 representing the variation between two consecutive bits of the navigation data message. The bit message reconstruction module 630, receives the resulting decoded bits $b_k$ and provides at the third output 631 the reconstructed navigation data message bit stream $b_k^{msg}$.

It is clear to those skilled in the art from the description herein that output values $\Delta_k$, available at the first output 616, which are not corresponding to bits included in Subframe 1-3 and index [61:300], are unconditionally transferred to the bit decoder 617 and are not processed by the filter and selection module 700. To this purpose the frame synchronizer 62 or another suitable manager module, disables the filter and selection module 622 and connects directly the first output 616 to the bit decoder 617 for those bits not included in subframes 1-3, and within these subframes not having index [61:300].

Frame synchronizer 62 detects the position of the demodulated bits within the frame structure of the navigation data message and checks the parity of each received subframe. When the frame synchronizer 62 receives the complete subset of bits $b_k^{msg}$ belonging to subframes 1-3, index [61, 300], and the parity check is satisfied, meaning that the ephemeris has been correctly received and decoded, the frame synchronizer 62 sends a reset command signal, Reset, to storage module 701. The reset command signal Reset causes the designated settings of the memory locations of the storage module 701 to reset. With reference to a specific embodiment, the reset command signal Reset is issued when the parity check is satisfied by each word of the set [word3-word10], of subframes 1-3, belonging to the same decoded frame.

According to another example, the frame synchronizer 62 can collect the decoded words [word3-word10], of subframes 1-3 that successfully pass the parity check, received across different consecutive frames, and issue the reset command signal Reset when the complete subset of words [word3-word10] of subframes 1-3 has been successfully received and decoded across different consecutive frames.

Figure 7:
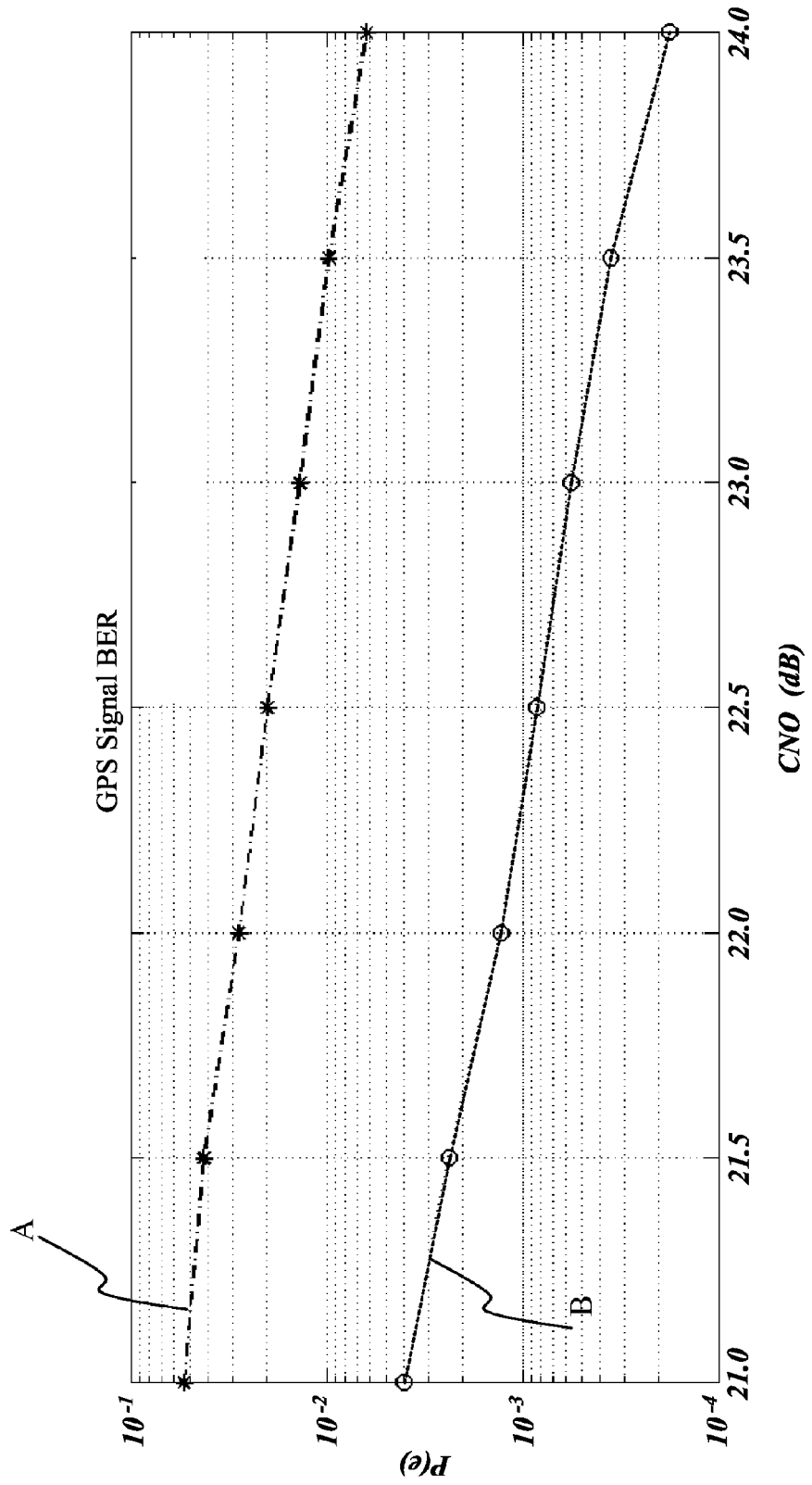
FIG. 7 shows simulation result plots: a first plot representing performance in terms of the bit error rate versus Carrier to Noise Ratio (CN0) for a D-BPSK demodulator according to prior art; a second plot representing performance in terms of the bit error rate versus Carrier to Noise Ratio (CN0) for a D-BPSK demodulator according to the embodiment of FIGS. 3 and 4.

FIG. 7 shows simulation result plots. A first plot A represents performance in terms of the bit error rate P(e) versus CN0 in dB for a D-BPSK demodulator according to a prior art technique. This known D-BPSK demodulator employs a reference phasor computational module which provides as a reference phasor only the preceding past phasor $I_{k-1}+jQ_{k-1}$ and does not include the filter and selection module.

FIG. 7 in addition shows a second plot B representing performance in terms of the bit error rate P(e) versus CN0 for a D-BPSK demodulator 61 as described with reference to FIGS. 4 and 5. In particular the second plot B refers to performance obtained employing a reference phasor computational module 611 performing a weighted average based on two past phasors, and a filtering module 622 performing a filtering based on three output values provided at the first output 616 and associated with the same bit, being the third gain coefficient γ, and the forth gain coefficient δ set to 1 (FIG. 5). For the simulation of plot B it is assumed that during the reception of the three output values the quality estimated value QEV (FIG. 3) is below the threshold value TH. As evident from FIG. 7 the second plot B shows performance improved by 5 dB with respect to the first plot A.

It is observed moreover that the teachings provided in the present description with reference to a navigation satellite system receiver can also be applied to phase shift keying demodulators of others communication systems, as evident to those skilled in the art.

The above description has been given with reference to a Binary Phase Shift Keying BSPK modulating signal. Nevertheless, the described teachings can be easily extended to a M-Phase Shift Keying M-PSK modulating signal, as evident to those skilled in the art.

With reference to the filter and selection module 700, it is noticed that the teachings of the filter and selection module 700 can be also applied in demodulators of M-PSK digital modulated signal, employing a non-differential demodulation technique. In addition the filter and selection module 700 can be also used in demodulators of digital modulated signals, not necessarily employing a phase shift keying modulation type, such as multi-level quadrature amplitude modulation (M-QAM), frequency shift keying (FSK) digital modulated signals, which is used in communication systems showing a periodic repetition of the same data message.

As it is clear to those skilled in the art, with reference to embodiments relating to non-differential demodulation technique, demodulators analogous to the embodiment of FIG. 3, but not including the reference phasor computational module 611, the phase differentiator 612 and the bit message reconstruction module 630 can be employed.

Moreover D-BPSK demodulator 61 of FIG. 3 can employ a reference phasor computational module providing as a reference phasor only the preceding past phasor $I_{k-1}+jQ_{k-1}$.

The various embodiments described above can be combined to provide further embodiments. All of the U.S. patents, U.S. patent application publications, U.S. patent applications, foreign patents, foreign patent applications and non-patent publications referred to in this specification are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A digital modulated signal demodulator comprising: an input structured to receive a past value and a current value, both the past value and the current value associated with a same bit of global navigation satellite system data transmitted in different time instants; a bit decoder configured to provide a decoded bit from an input value wherein said bit decoder is structured to provide said decoded bit according to a maximum likelihood criteria; a quality signal evaluation module configured to provide a quality signal representing a quality of the current value; a filtering module structured to provide a filtered value computed as a weighted average of said past value and said current value, said filtering module structured to receive a reset signal based on the quality signal; and a selection module coupled between said input structure and said bit decoder, the selection module being configured to: transfer the current value as the input value of the bit decoder if the quality is greater than a reference value; and transfer the filtered value as the input value of the bit decoder if the quality is not greater than the reference value.

2. The demodulator of claim 1, wherein the filtering module is an infinite impulse response filter including:
a weighted average module structured to compute the filtered value as a sum of the current value multiplied by a first coefficient, and a stored value multiplied by a second coefficient, wherein said stored value is a weighted average of said past value.

3. The demodulator of claim 2, wherein the filtering module includes:
a further weighted average module structured to compute a memory reset value as a sum of the current value multiplied by a third coefficient, and the stored value multiplied by a fourth coefficient; and
a memory module structured to store the stored value, said stored value being one value between a preceding filtered value and said memory reset value.

4. The demodulator of claim 3, wherein the filtering module includes:
a further selection module, the further selection module configured to provide the reset memory value to the memory module to be stored as the stored value if the quality is greater than a reference value, and the further selection module further configured to provide the filtered value to the memory module to be stored as the stored value if the quality is not greater than the reference value.

5. The demodulator of claim 3, further comprising:
a bit message reconstruction module configured to receive decoded bits from the bit decoder and further configured to provide a reconstructed data message bit stream;
a data parity check module configured to perform a parity check on the reconstructed data message bit stream; and
a reset signal generator module structured to generate a reset signal of said memory module when the parity check is satisfied by a plurality of bits representing a complete ephemeris data set.

6. The demodulator of claim 1, wherein the quality signal evaluation module includes:
a quality signal meter configured to provide a quality estimated value corresponding to said quality; and
a comparator configured to compare the quality estimated value with a quality reference value and provide the quality signal.

7. The demodulator of claim 1, wherein said demodulator is a differential phase shift keying demodulator, further comprising:
an input structured to receive current data representing a current phasor and past data representing at least one past phasor;
a phase differentiator structured to process the current data and reference data representing a reference phasor, the phase differentiator further structured to provide to the input said current value, the current value representing a phase difference between said current and reference phasors; and
a reference phasor computational module configured to generate said reference data using said past data.

8. The demodulator of claim 7, wherein said past data includes past data representing at least two past phasors.

9. The demodulator of claim 1, wherein the demodulator is structured to demodulate signals representing an ephemeris data set of a global navigation satellite system.

10. The demodulator of claim 9, further including:
a manager module adapted to:
enable the filtering module and the selection module when the current value relates to the ephemeris data set; and
disable the filtering module and the selection module and transfer the current value at the input to the bit decoder when the current value relates to non-ephemeris data.

11. A receiving apparatus comprising: a receiving module configured to receive digitally modulated analog signals representing global navigation satellite system data and generate corresponding digital received signals; a processing module configured to process said digital received signals and generate a discrete-time sequence of samples; and a digital modulated signal demodulator structured to receive said discrete-time sequence of samples the digital modulated signal demodulator including: a terminal structured to receive a past value and a current value, both the past value and the current value associated with a same bit transmitted in different time instants, and both the past value and the current value obtained from said sequence of discrete-time samples; a bit decoder configured to provide a decoded bit from an input value according to a maximum likelihood criteria; a quality signal evaluation module configured to provide a quality signal representing a quality of the current value; a filtering module structured to provide a filtered value computed as a weighted average of said past value and the current value, said filtering module structured to receive a reset signal based on the quality signal; and a selection module coupled between said terminal and said bit decoder, the selection module configured to transfer the current value as the input value of the bit decoder if the quality is greater than a reference value, and the selection module further configured to transfer the filtered value as the input value of the bit decoder if the quality is not greater than the reference value.

12. The receiving apparatus of claim 11, wherein the filtering module is an infinite impulse response filter including:
a weighted average module structured to compute the filtered value as a sum of the current value multiplied by a first coefficient, and a stored value multiplied by a second coefficient, wherein said stored value is a weighted average of said past value.

13. The receiving apparatus of claim 12, wherein the filtering module includes:
a further weighted average module structured to compute a memory reset value as a sum of the current value multiplied by a third coefficient, and the stored value multiplied by a fourth coefficient; and
a memory module structured to store the stored value, said stored value being one value between a preceding filtered value and said memory reset value.

14. The receiving apparatus of claim 13, wherein the filtering module includes:
a further selection module, the further selection module configured to provide the reset memory value to the memory module to be stored if the quality is greater than a reference value, and the further selection module further configured to provide the filtered value to the memory module to be stored if the quality is not greater than the reference value.

15. The receiving apparatus of claim 14, wherein the receiving apparatus is structured to demodulate signals representing an ephemeris data set of a global navigation satellite system.

16. The receiving apparatus of claim 15, wherein said processing module comprises:
an acquisition module configured to detect a plurality of parameters associated with signals transmitted by a plurality of satellites of the global navigation satellite system; and
a tracking module configured to:
process said plurality of parameters;
compute frequencies of said signals;
compute travel time values of said signals; and
generate said discrete-time sequence of samples representing a navigation data message.

17. The receiving apparatus of claim 16, further comprising:
a subframe recovery module including said demodulator, the subframe recovery module structured to receive the discrete-time sequence of samples, and the subframe recovery module further structured to reconstruct the navigation data message;
an ephemeris and pseudorange module structured to receive the navigation data message, the ephemeris and pseudorange module further structured to compute distances between said plurality of satellites and the receiving apparatus;
a satellite position computing module structured to compute positions of said plurality of satellites from said navigation data message and said travel times; and
a user position computing module configured to compute a receiving apparatus position from said distances and said positions of said plurality of satellites.

18. A demodulation method comprising: demodulating a digital modulated signal representing an ephemeris data set of a global navigation satellite system, the demodulating including: receiving a past value and a current value, both the past value and the current value associated with a same bit transmitted in different time instants; evaluating a quality of the of the current value; performing a weighted average of said past value and said current value to provide a filtered value; conditionally transferring the current value to an output if the quality is greater than a reference value; conditionally transferring the filtered value to the output if the quality is not greater than the reference value; resetting the weighted average based on the quality; decoding a value available at the output according to a maximum likelihood criteria; and generating a corresponding decoded bit.

19. The demodulation method of claim 18, wherein performing the weighted average comprises:
   performing a first summation of the current value multiplied by a first coefficient, and a stored value multiplied by a second coefficient, the first summation performed to obtain the filtered value, wherein said stored value is a weighted average of said past value;
   performing a second summation of the current value multiplied by a third coefficient, and the stored value multiplied by a fourth coefficient, the second summation performed to compute a memory reset value; and
   storing the stored value, wherein said stored value is one value between a preceding filtered value and said memory reset value.

* * * * *